(12) United States Patent
Issac et al.

(10) Patent No.: US 9,325,384 B2
(45) Date of Patent: Apr. 26, 2016

(54) MISALIGNMENT-TOLERANT HIGH-DENSITY MULTI-TRANSMITTER/RECEIVER MODULES FOR EXTREMELY-HIGH FREQUENCY (EHF) CLOSE-PROXIMITY WIRELESS CONNECTIONS

(71) Applicant: Keyssa, Inc., Campbell, CA (US)

(72) Inventors: Roger Issac, San Jose, CA (US); Gary Davis McCormack, Tigard, OR (US); Ian A. Kyles, West Linn, OR (US)

(73) Assignee: Keyssa, Inc., Campbell, CA (US)

( * ) Notice: Subject to any disclaimer, the term of this patent is extended or adjusted under 35 U.S.C. 154(b) by 0 days.

(21) Appl. No.: 14/207,775

(22) Filed: Mar. 13, 2014

(65) Prior Publication Data

US 2014/0273853 A1 Sep. 18, 2014

Related U.S. Application Data

(60) Provisional application No. 61/893,061, filed on Oct. 18, 2013, provisional application No. 61/799,605, filed on Mar. 15, 2013.

(51) Int. Cl.
*H04B 7/00* (2006.01)
*H04B 5/00* (2006.01)
*H04B 5/02* (2006.01)

(52) U.S. Cl.
CPC ............... *H04B 5/0031* (2013.01); *H04B 5/02* (2013.01)

(58) Field of Classification Search
CPC ..... H04W 84/18; H04W 88/06; H04W 76/02; H04W 88/02; H04M 1/7253; H04M 1/72519; H04M 1/72522; H04M 1/0214
USPC ..................................... 455/41.2, 550.1, 333
See application file for complete search history.

(56) References Cited

U.S. PATENT DOCUMENTS

| | | | |
|---|---|---|---|
| 2010/0159829 A1 | 6/2010 | McCormack | |
| 2012/0295539 A1 | 11/2012 | McCormack et al. | |
| 2013/0070817 A1* | 3/2013 | McCormack | H04B 1/18 375/219 |
| 2013/0106673 A1* | 5/2013 | McCormack | H01L 23/66 343/893 |
| 2013/0183903 A1* | 7/2013 | McCormack | H04B 1/40 455/41.2 |
| 2013/0217336 A1 | 8/2013 | McCormack et al. | |
| 2013/0257670 A1 | 10/2013 | Sovero et al. | |
| 2013/0266026 A1 | 10/2013 | McCormack et al. | |

OTHER PUBLICATIONS

PCT International Search Report and Written Opinion, PCT Application No. PCT/US2014/061409, Feb. 4, 2015, 15 pages.

* cited by examiner

*Primary Examiner* — Nhan Le
(74) *Attorney, Agent, or Firm* — Fenwick & West LLP

(57) ABSTRACT

Docked devices communicate wirelessly and in close proximity using multiple transmitters of Extremely High-Frequency (EHF) signals of 30-300 GHz. The devices may not be precisely aligned when docked. Tolerance of misalignment is improved by adding barriers such as solid metal blocks or rows of metal-filled vias that have a spacing of less than one-quarter the EHF wavelength. The barriers reflect EHF radiation and prevent EHF radiation from penetrating the barrier. Barriers placed between adjacent transmitters and receivers block stray electromagnetic radiation from causing cross-talk. The barriers can be placed closer to the transmitters than to the receivers to allow for a wider area for reception, permitting a wider misalignment. EHF reflecting features such as ground planes spaced a quarter-wavelength apart may be added to an end of a substrate near a connecting edge to act as a barrier and reflect electromagnetic radiation back toward an intended receiver.

20 Claims, 19 Drawing Sheets

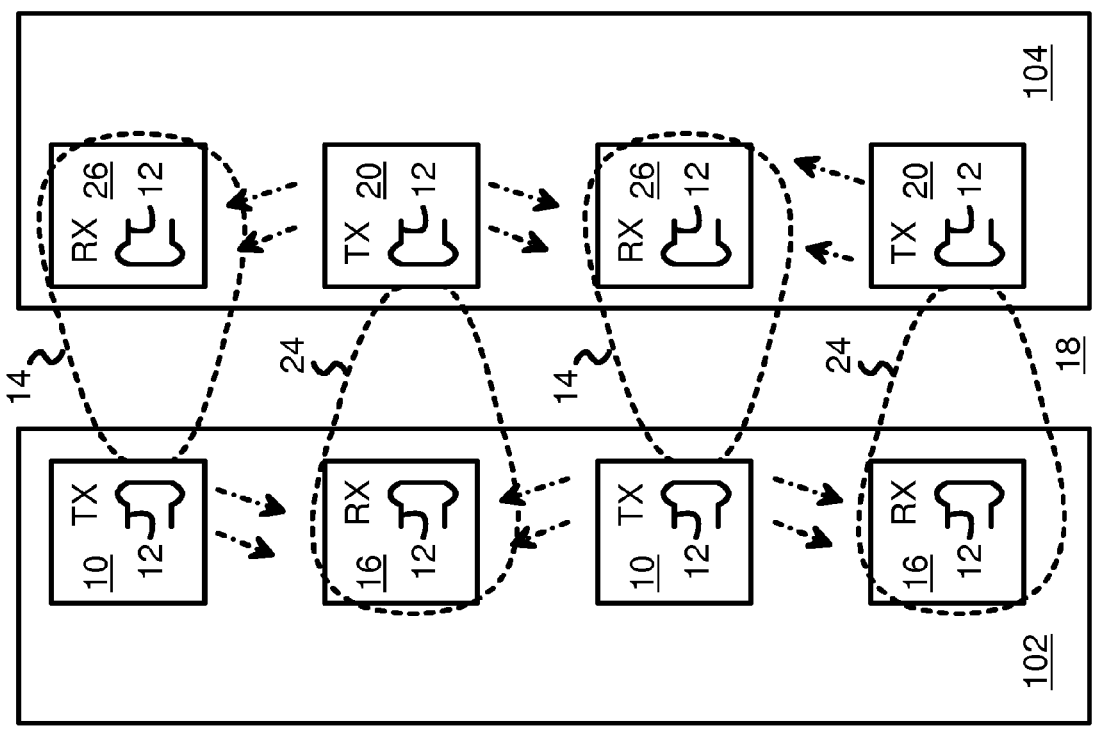

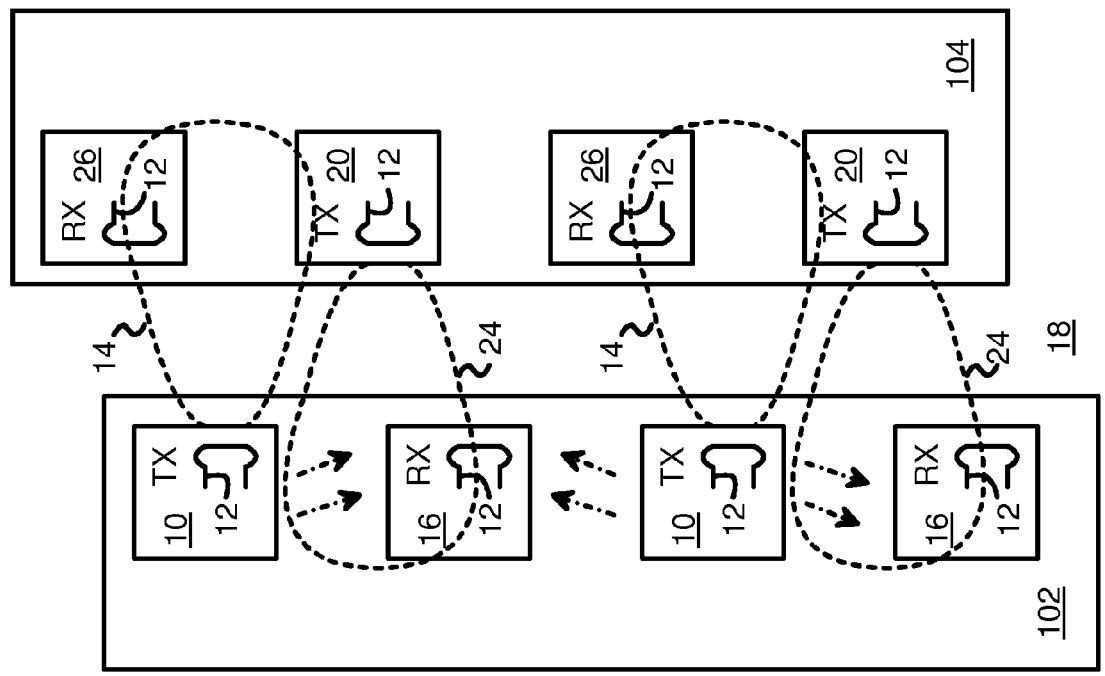

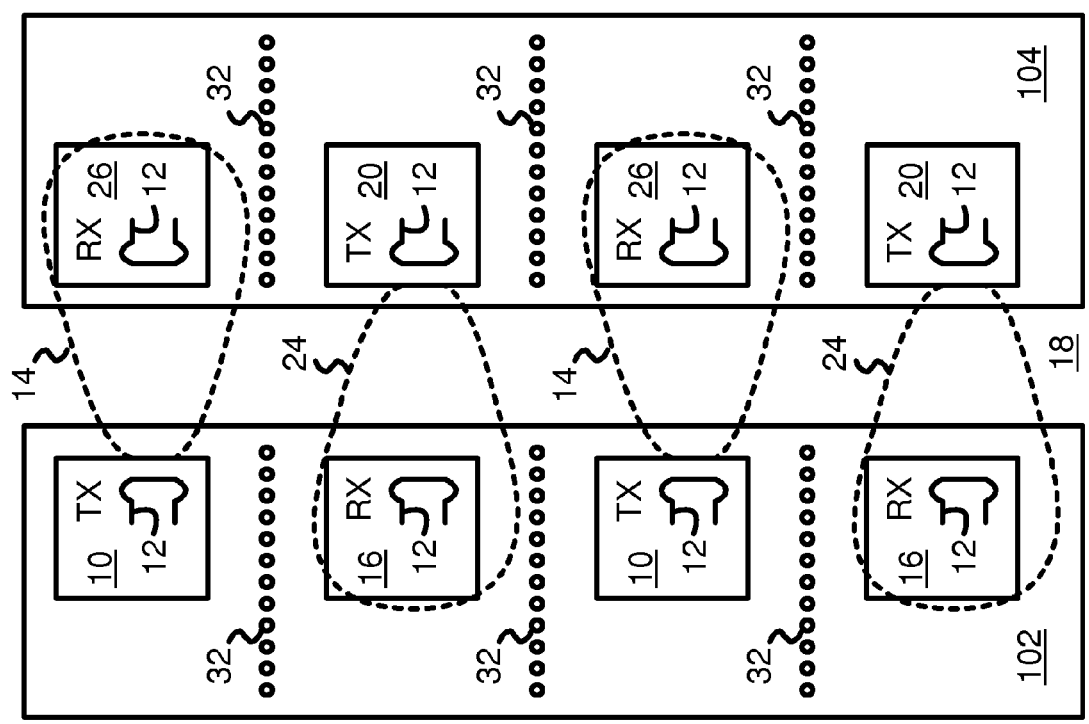

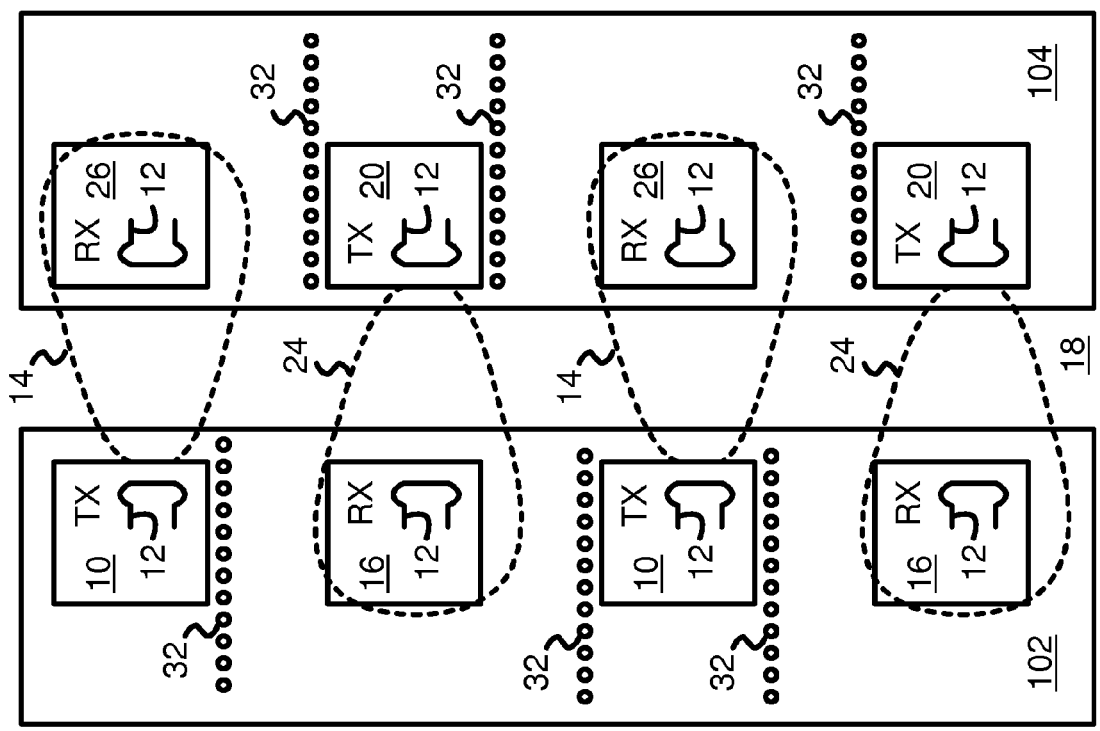

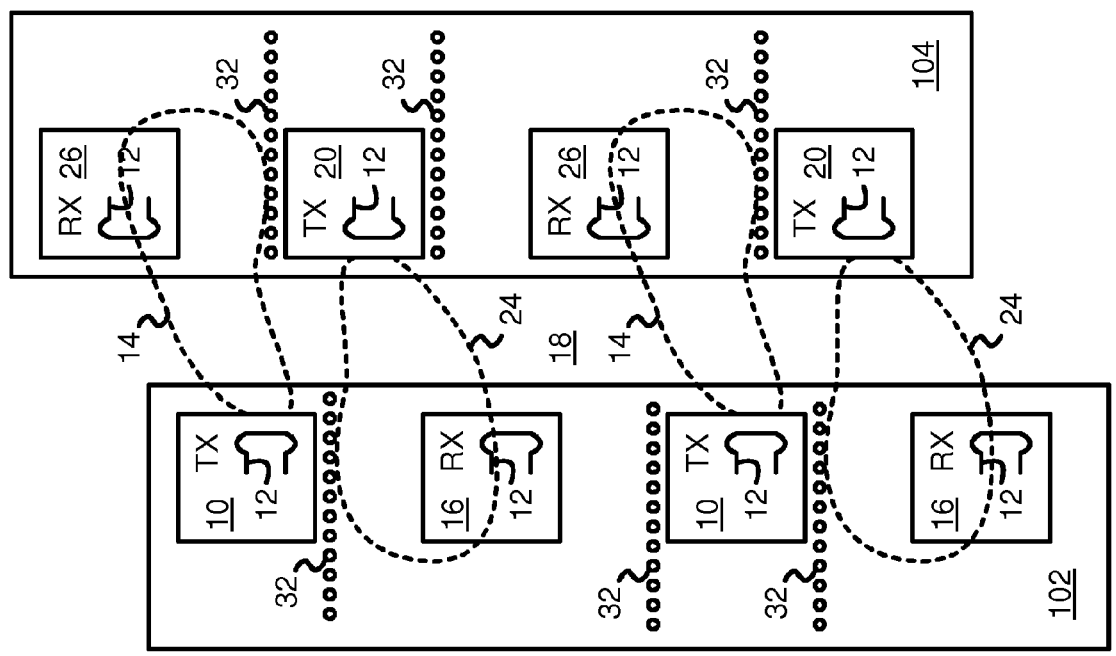

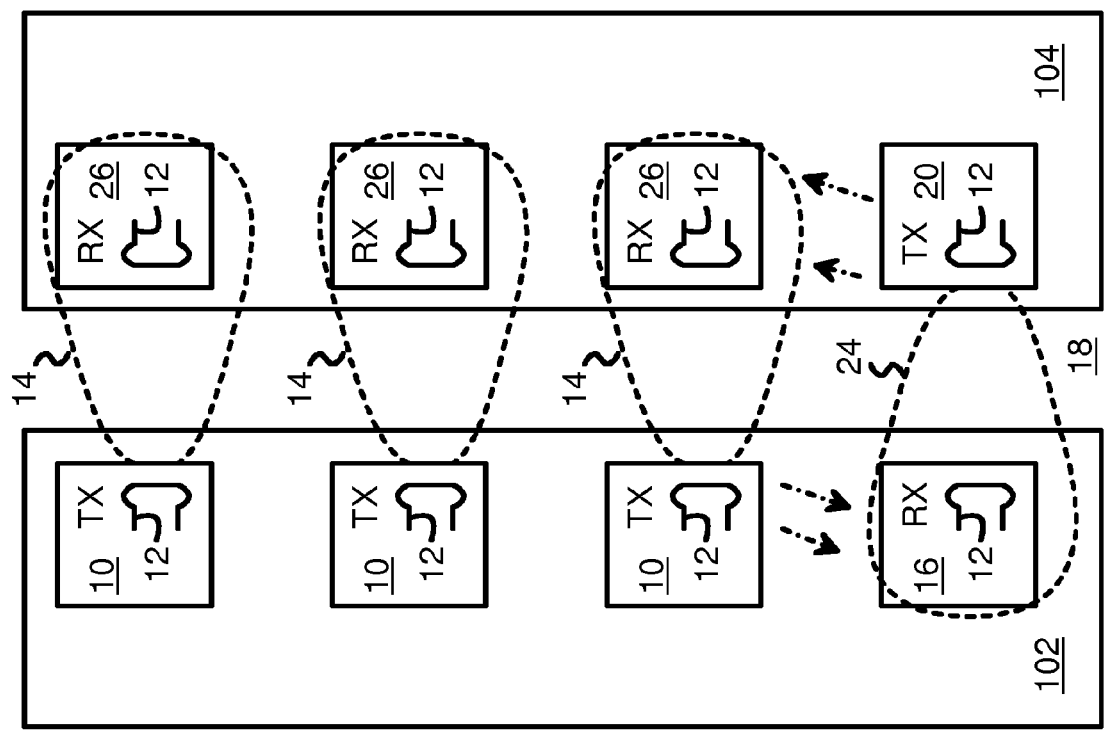

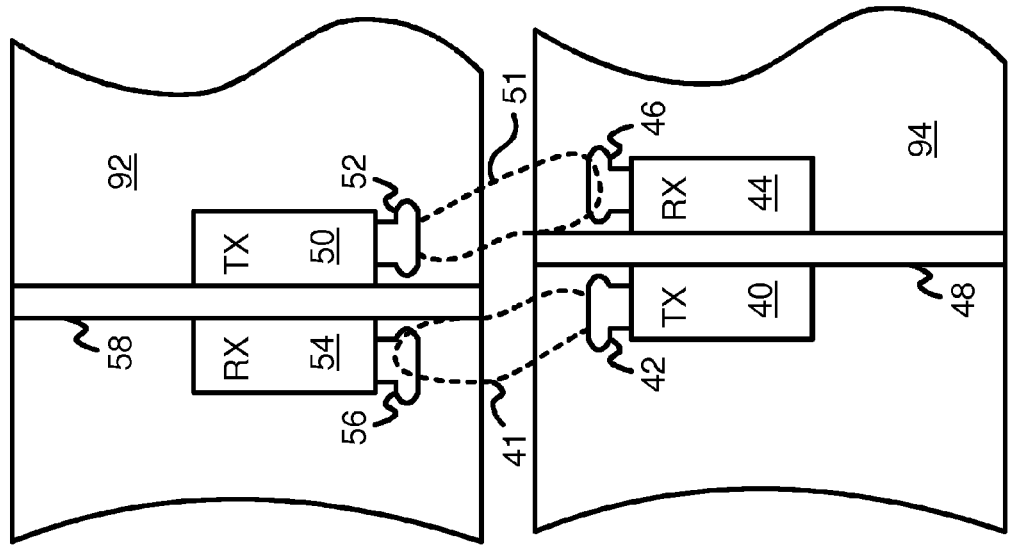
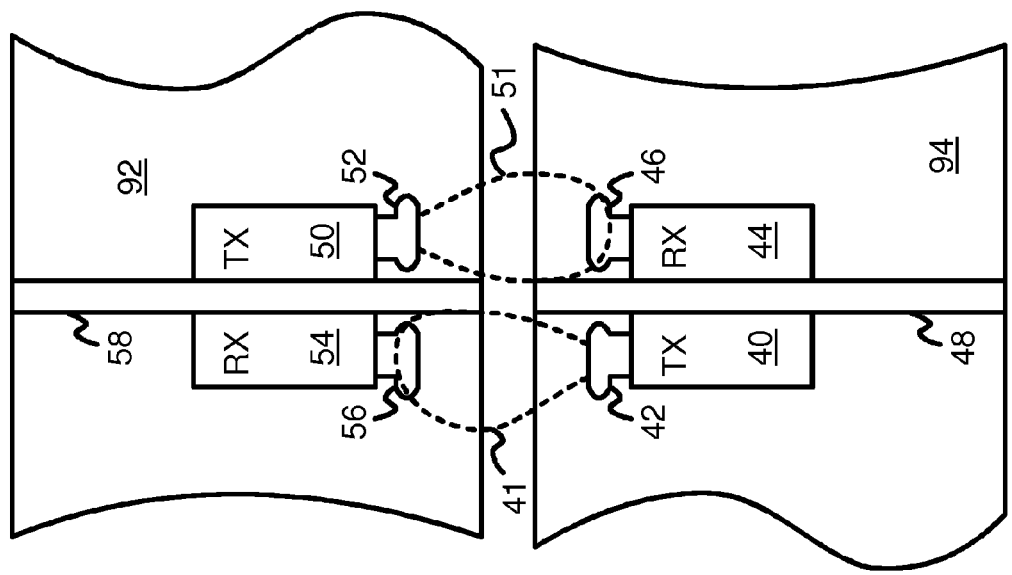

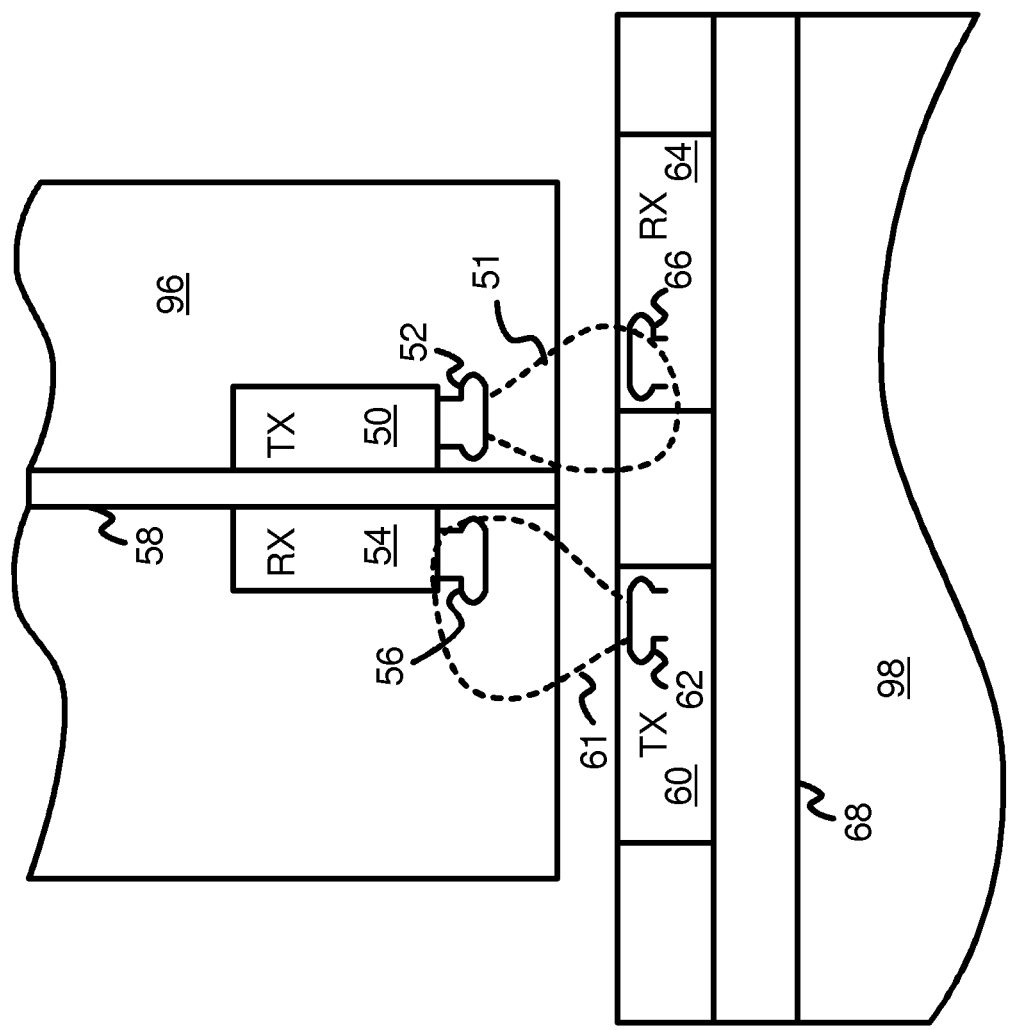

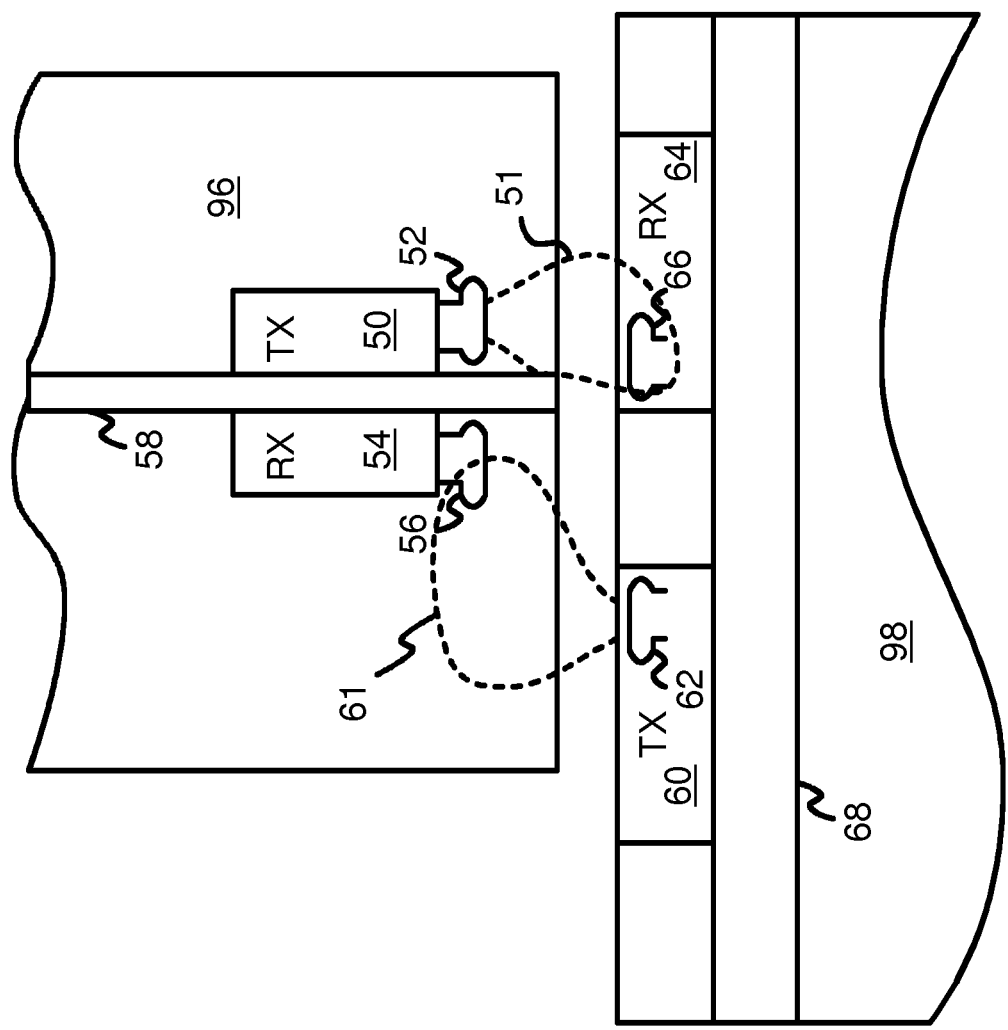

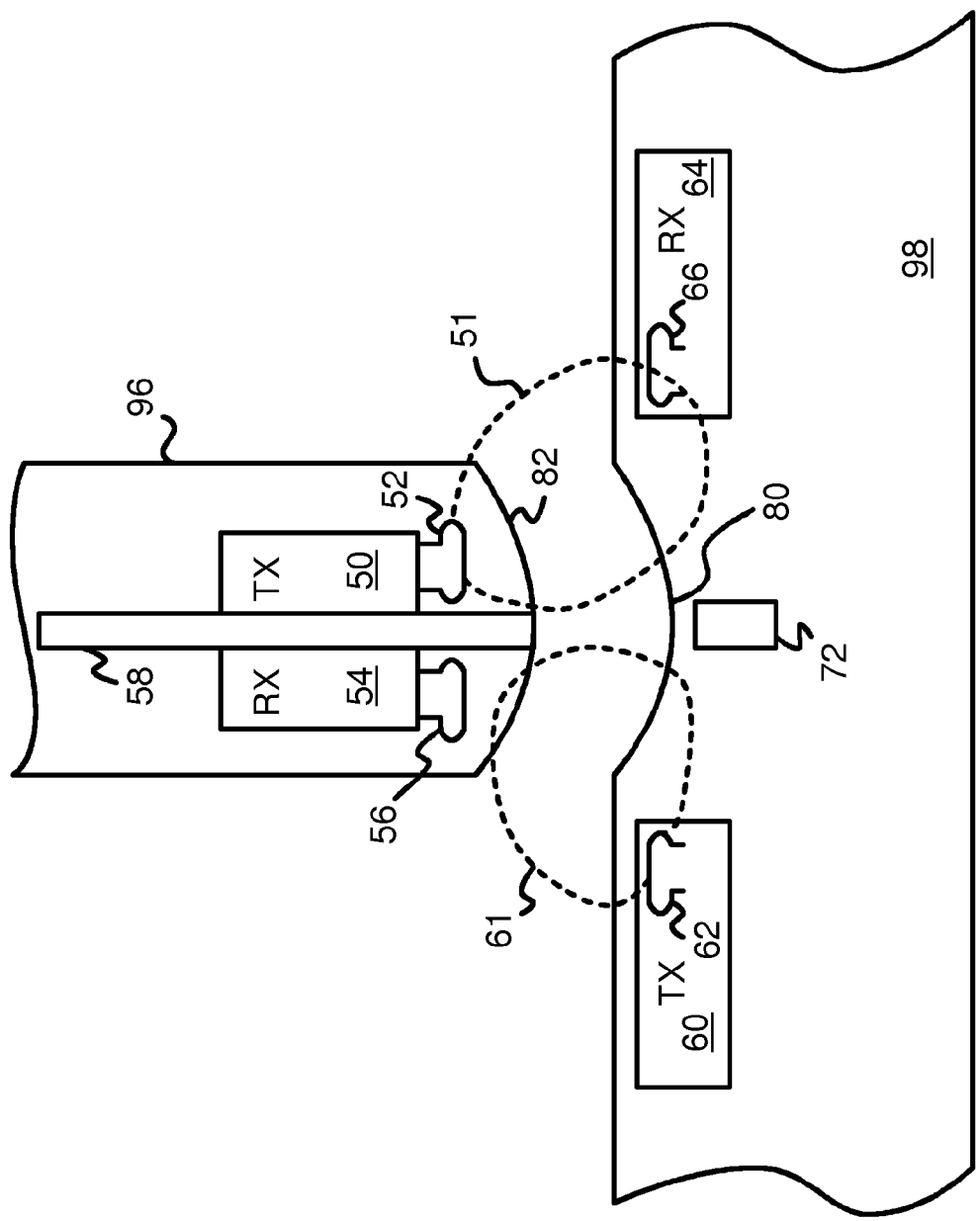

MISALIGNMENT-TOLERANT HIGH-DENSITY MULTI-TRANSMITTER/RECEIVER MODULES FOR EXTREMELY-HIGH FREQUENCY (EHF) CLOSE-PROXIMITY WIRELESS CONNECTIONS

RELATED APPLICATION

This application claims the benefit of U.S. Provisional Application No. 61/799,605, filed Mar. 15, 2013, for "Carrier Based Multi-Chip Communications Module" and of U.S. Provisional Application No. 61/893,061, filed Oct. 18, 2013, for "EHF Fields Propagation Methods and Systems".

FIELD OF THE INVENTION

This invention relates to close-proximity transceivers, and more particularly to improving tolerance of misalignment by redirecting electromagnetic radiation.

BACKGROUND OF THE INVENTION

Wireless communication devices typically feature a transmitter chip that drives an antenna. The antenna may be integrated inside the transmitter chip, but more commonly the transmitter chip and the antenna are integrated onto a module or other device.

Lower frequencies with longer wavelengths have a larger near-field region than do higher frequency signals. Thus radio waves commonly used with Radio-Frequency Identification (RFID) have a near-field region of about a few meters, but the data rates are limited by the radio frequency to perhaps several kHz to a few MHz. Thus RFID systems tend to transmit small amounts of data, such as identifier data.

It is desired to wirelessly transmit video and other data that require high data rates. RFID is too limited by the low frequency of radio waves. The assignee has developed wireless communication systems that use Extremely High-Frequency (EHF) electromagnetic radiation rather than using Radio-Frequency (RF) electromagnetic radiation. EHF radiation has a frequency in the range of 30 GHz to 300 GHz. This higher frequency allows for data rates as much as 1,000 times faster than with RF. However, the wavelength of radiation is much smaller than for RF. The smaller EHF wavelength reduces the near-field envelope to perhaps 1 or 2 centimeters.

The related application by the inventors, U.S. Ser. No. 61/799,605, shows placement of multiple EHF devices on a common substrate in order to isolate radiation from one device to a neighboring device and to establish a common PCB structure to define end product characteristics, such as working distance and crosstalk between devices. The use of structures within the substrate and surrounding the substrate allows for redirection of electromagnetic radiation. Electromagnetic radiation emitted from a transducer (with transmission and/or reception properties similar to an antenna but realizable with multiple physical configurations) may be directed upward by such structures to allow a receiver to be placed above the transmitter. This is known as vertical launch of the electromagnetic radiation. Alternatively, electromagnetic radiation from the transmitting transducer may be directed sideways by such structures to allow a receiver to be placed beside the transmitter. This is known as edge launch of the electromagnetic radiation. Electromagnetic radiation from the transmitting transducer also may be directed parallel to a substrate or perpendicularly to a substrate.

While the substrate structures are useful in redirecting electromagnetic radiation from a single transmitter to a single receiver, it is also desired to have multiple transmitters on a same device or substrate structure. For example, the signaling bandwidth of a single transmitter-receiver pair may be less than a desired bandwidth. Having two transmitter-receiver pairs may double the available bandwidth, while having four transmitter-receiver pairs may quadruple the available bandwidth.

Therefore, it is sometimes desired to have multiple transmitters and receivers on each mated device. For example, a tablet computing device may have two transmitters and two receivers, which communicate with two receivers and two transmitters on a dock or base-station device when in close proximity. However, the envelopes of electromagnetic radiation from the multiple transmitters may superimpose on each other, potentially causing interference, cross-talk, standing waves, nodes, nulls, and/or other phenomena. This interference may lead to impaired signal integrity and reception at the receivers, and erratic carrier waves and signaling.

When the mated devices are not exactly in alignment with each other, the interference phenomena may vary with the amount of mis-alignment of the two mated devices. The amount of signal degradation may vary with position and alignment. Since the size of the electromagnetic radiation envelopes may be quite small, such as 1-2 cm or less, and nodes caused by two or more interfering envelopes may be spaced only a millimeter or so apart, a small misalignment of only a few millimeters may cause drastic changes in signal strength. The receiving transducer may be moved from a maxima within the interfering envelopes to a minima node within the envelopes by a slight repositioning. This sensitivity to misalignment is undesirable.

What is desired is a close-proximity communication device that is tolerant to mis-alignment with a mated device. A close-proximity communication device having substrate structures to reflect, absorb, or direct electromagnetic radiation is desirable to prevent or reduce multi-path interference from superposition of multiple electromagnetic radiation envelopes emitted from multiple transmitters that are close to one another. Structures to isolate one transmitter's electromagnetic radiation envelope from the electromagnetic radiation envelope of another transmitter are desirable.

BRIEF DESCRIPTION OF THE DRAWINGS

FIG. 1 shows multi-transmitter and multi-receiver devices communicating in close proximity.

FIG. 2 shows mis-aligned close-proximity devices with multiple transmitters/receivers.

FIGS. 3A-B show multi-transmitters and multi-receivers in devices with electromagnetic radiation barriers in the substrates to improve misalignment tolerance.

FIGS. 4A-C show multi-transmitters and multi-receivers in devices with asymmetric electromagnetic radiation barriers in the substrates to further improve misalignment tolerance.

FIG. 5 shows mated devices with a higher forward bandwidth than a reverse bandwidth.

FIGS. 7A-B show misalignment-tolerant edge-firing devices.

FIGS. 8A-B highlight misalignment-tolerant close-proximity communication for perpendicularly-connected devices.

FIGS. 10A-C highlight an alignment key and docking barrier to improve misalignment-tolerance for close-proximity perpendicularly-connected devices.

DETAILED DESCRIPTION

Figure 3B:
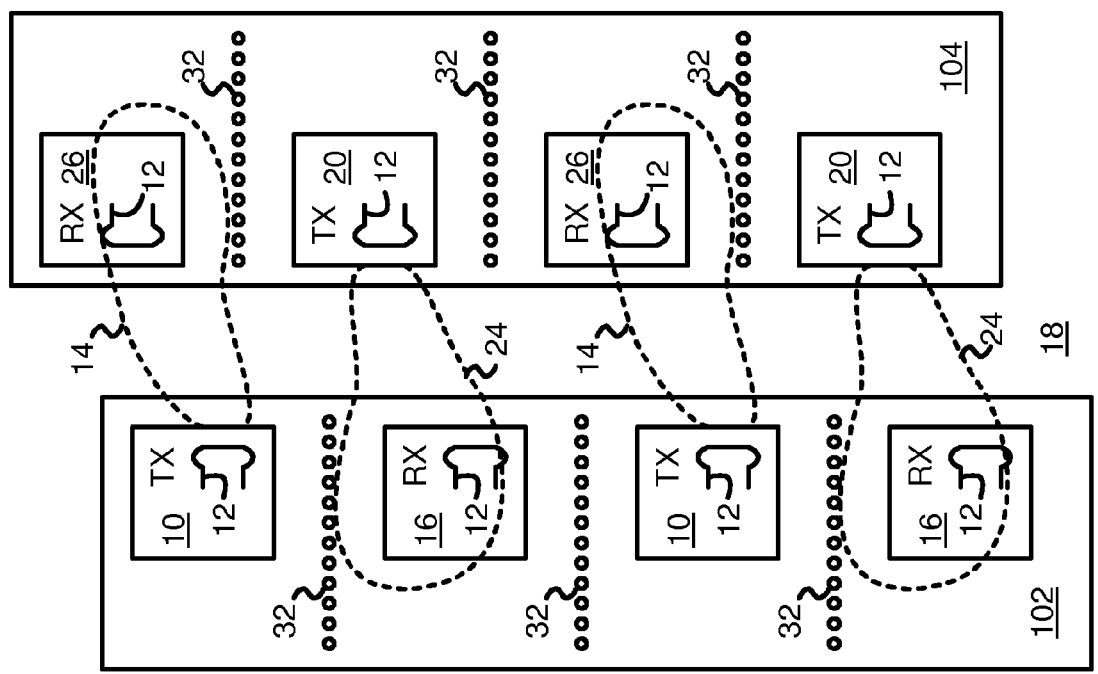

The present invention relates to an improvement in alignment-tolerant close-proximity transceivers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 1 shows multi-transmitter and multi-receiver devices communicating in close proximity. Having multiple transmitter-receiver pairs per device increases the available data bandwidth. Device 102 is in close proximity to mated device 104, separated by air gap 18, which may approach or be zero when devices 102, 104 touch. Transmitters and receivers may communicate using electromagnetic signaling through transducers that generate/receive electromagnetic radiation in/from an envelope of radiation. Transducers 12 in transmitter 10 and receiver 26 may be at a distance of 0.1 mm to 2 cm from each other when in close proximity. Receiver 26 may operate best when within the near-field region of transmitter 10, but may also receive a sufficiently strong signal when in a transitional region or when in the far-field region.

The envelope of radiation produced by a EHF transmitter device may be modified by a number of factors, including but not limited to, the type, structure, and positioning of an EHF transducer within the device or outside of the device, the type and thickness of a mold compound used to encapsulate the device, metallic and dielectric structures surrounding the transmitter device, the PCB type and substrate beneath the device, metal traces on the PCB, ground planes, waveguides, and other similar structures near the EHF transmitter device. Similarly, a radiation envelope that extends near an EHF receiver device is affected by similar factors. In order to achieve a good connection between an EHF transmitter and an EHF receiver, the placement and type of structures surrounding both the EHF transmitter and EHF receiver must be taken into account. As shown in this invention, the proper use of these structures can improve connections between these devices.

Device 102 has two transmitters 10 that each generate an electromagnetic radiation envelope 14. Receivers 26 on mated device 104 have transducers 12 that may be within envelopes 14 emitted by transmitting transducers 12 of transmitters 10 on device 102.

Mated device 104 has two transmitters 20 that each generate an electromagnetic radiation envelope 24. Receivers 16 on device 102 have transducers 12 that are within envelopes 24 emitted by transmitting transducers 12 of transmitters 20 on device 104. Thus there are two forward channels from device 102 to mated device 104, and two reverse channels from mated device 104 back to device 102.

Envelope 14 is a simplification or abstraction of a more complex electromagnetic radiation field. Envelope 14 indicates an area where a receiver may receive a sufficiently strong signal to retrieve communication data. When receiver 26 is moved outside of envelope 14, the signal may not be strong enough for good reception of communication of data. When receiver 26 is moved to within envelope 14, signal strength may be strong enough for good reception of communication of data. The actual shape of the electromagnetic radiation field is more complex than shown for envelope 14, but envelope 14 is a useful simplification for explaining close-proximity communication. Also, the signal strength decreases gradually at the boundary of envelope 14.

Transmitters 10 may emit radiation in a directional manner so that envelope 14 is directed away from device 102. Although adjacent receiver 16 may be closer to transmitter 10 than to intended receiver 26, the directional nature of envelope 14 directs most of the electromagnetic radiation away from adjacent receiver 16 and toward intended receiver 26.

However, some radiation may be present outside of envelope 14. This leakage radiation may cause cross-talk with unintended receivers. For example, transmitter 10 in device 102 may leak radiation to adjacent receiver 16 that is also in device 102. Thus receiver 16 may receive the intended signal from transmitter 20 of mated device 104, through envelope 24, and also receive some unintended radiation from adjacent transmitter 10. When receiver 16 is adjacent to two transmitters 10, such as for the upper receiver 16 in device 102, the received leaked radiation may be doubled. This leaked radiation from adjacent transmitters (shown as arrows in FIG. 1) on the same device is undesirable. The problem of leaked radiation is more pronounced for transmitters and receivers that are communicating through Extremely High Frequency (EHF) signaling in a similar or the same frequency band (for example, around 60 GHz). The EHF band is between 30-300 GHz. This dictates the placement of transmitters/receivers on the same device to be further apart or to have specialized isolation structures in between transmitters and receivers on the same device, increasing complexity and/or cost. EHF signaling between multiple transmitter/receiver pairs using different frequency bands may mitigate the issue of leakage due to physical placement but may increase the complexity, power and cost of the transmitter and receiver solutions. Having multiple transmitters/receivers on multiple devices provides the benefit of greatly improved bandwidth but raises the issue of increased cost and complexity for reliable communication. Hence, low cost/low complexity substrate solutions are needed that can enable close proximity communication (through EHF signaling) to improve effective bandwidths for multiple channel solutions by mitigating leakage and/or crosstalk. These solutions need to have consistent performance for different practical situations, including but not limited to reasonable misalignment between devices and asymmetry in substrate configurations. Embodiments presented in this disclosure are directed towards substrate solutions that intend to provide these solutions in devices or systems.

Alignment of devices, as used herein, refers to the relative physical placement of substrate structures or transducers that enable the electromagnetic radiation from a transmitter to be maximally detected by an intended receiver.

EHF reflecting material on a substrate surface(s) may refer to material added (or placed) to either the top surface, in a layer within a substrate, through the substrate, or around the substrate.

FIG. 2 shows mis-aligned close-proximity devices with multiple transmitters/receivers. In FIG. 2, device 102 is not exactly aligned with mated device 104. This misalignment causes transducer 12 in receiver 26 to no longer be centered within envelope 14. Instead, some of transducer 12 in receiver 26 is outside of envelope 14. Thus the received signal by receiver 26 is reduced when compared to the aligned devices of FIG. 1.

Likewise, receiver 16 is no longer centered within envelope 24 from transmitter 20. The signal strength received by receiver 16 from envelope 24 is reduced. Thus misalignment of close-proximity devices may reduce the received signal strength.

While the received signal is weaker due to misalignment, the leaked radiation from adjacent transmitters on the same device is not affected by misalignment, since the spacing between transmitters 10 and receivers 16 on device 102 is fixed. Thus the unintended radiation from adjacent transmitters is not reduced, while the intended signal from the misaligned device is reduced because of the misalignment. The ratio of the intended radiation to unintended radiation is thus reduced by the misalignment. Therefore cross-talk is relatively stronger and more of a problem when devices are misaligned.

FIGS. 3A-B show multi-transmitters and multi-receivers in devices with electromagnetic radiation barriers in the substrates to improve misalignment tolerance. Barrier 32 is a row of vias, such as holes in a printed-circuit board (PCB) that are filled with metal. Vias are normally used to connect metal traces on different metal layers on a PCB. The metal-filled vias are used here to form a substrate barrier to electromagnetic radiation. The electromagnetic radiation tends to reflect off of the metal in the vias of barrier 32, re-directing the electromagnetic radiation, and mitigating the electromagnetic radiation from passing beyond barrier 32. Vias are one example of a barrier. Barrier 32 could be augmented or replaced with other structures or materials on top of, within, and on the bottom of the substrate. These structures may reflect, direct, or absorb EHF radiation in order to mitigate crosstalk and improve the connection between two devices.

The spacing between adjacent vias in barrier 32 should be much smaller than the wavelength of the targeted electromagnetic radiation, such as one-quarter of a wavelength. For example, EHF radiation emitted from transmitters 10, 20, may have a 60 GHz signal which has a wavelength of 5 mm in air and may be further reduced when it passes through dielectric materials such as substrates. In order to prevent leakage of radiation through the substrate, a 0.5 mm or less spacing between adjacent vias in barrier 32 would be required in order to reflect the EHF radiation. These vias could be augmented or replaced with other structures or materials on top of, within, and on the bottom of the substrate.

Barrier 32 is placed between each pair of adjacent transmitter 10 and receiver 16 on device 102, and between each pair of adjacent transmitter 20 and receiver 26 on mated device 104. The two barriers 32 surrounding receiver 16 tend to direct the intended radiation from envelope 24 back into receiver 16. Also, stray radiation from transmitters 10 are directed back toward transmitters 10 by barriers 32, preventing the stray radiation from transmitters 10 from reaching receivers 16. Thus barriers 32 reduce stray radiation and cross-talk from adjacent transmitters onto the receiver, and may also strengthen the intended radiation from envelope 24 by reflecting or directing this radiation back toward intended receiver 16.

In FIG. 3B, a mated device 104 is mis-aligned with device 102. Barriers 32 still reduce or prevent cross-talk from stray radiation from transmitters 10 on the same device 102 from reaching receivers 16. In addition, barriers 32 help to redirect the intended radiation emitted by transmitters 20 as envelope 24 toward intended receivers 16. The mis-alignment of devices 102, 104 causes envelopes 14, 24 to no longer be centered on intended receivers 26, 16. Instead, more of the electromagnetic radiation from envelopes 14, 24 reaches barriers 32. Barriers 32 direct or reflect this electromagnetic radiation back into envelopes 14, 24 and toward receivers 26, 16. This reflection by barriers 32 causes the shapes of envelopes 14, 24 to be skewed toward intended receivers 26, 16. The edges or boundaries of envelopes 14, 24 touch barriers 32 but may not extend beyond barriers 32 or may extend minimally.

Thus more of the transmitted radiation reaches intended receivers 16, 26 as a result of reflection off of barriers 32. Reception is less dependent on the exact alignment between devices 102, 104. Barriers 32 increase the tolerance to misalignment of devices 102, 104.

However, as the amount of mis-alignment increases, eventually some of the transmitted radiation may impinge upon the other side of barriers 32, the side facing away from intended receivers 26, 16. This radiation reaching the wrong side of barriers 32 may be reflected away from intended receivers 26, 16, reducing the received signal strength. Envelopes 14, 24 may then be split by barriers 32, forming a forked shape. Also, some of the transmitted radiation may impinge upon the first via in barriers 32 and be reflected backwards toward the transmitter or at some other angle away from intended receivers 26, 16. This is undesirable, but it occurs only with larger mis-alignments.

Figure 4B:
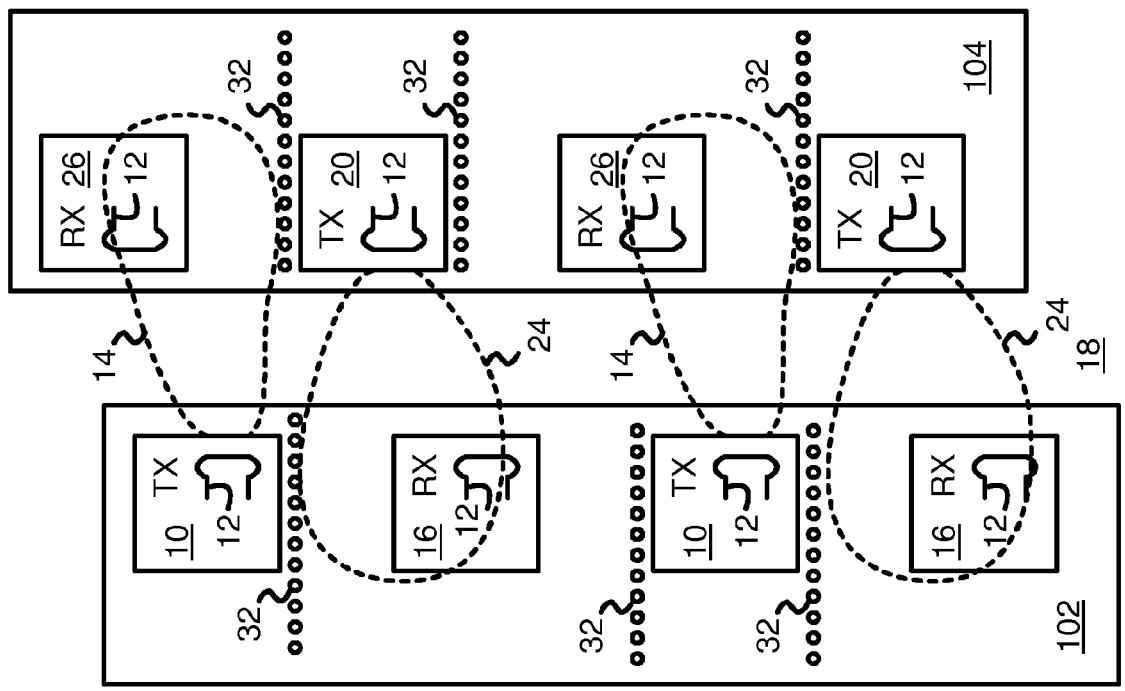

FIGS. 4A-C show multi-transmitters and multi-receivers in devices with asymmetric electromagnetic radiation barriers in the substrates to further improve misalignment tolerance. In FIG. 4A, barriers 32 are not centered between adjacent transmitters and receivers as shown in FIG. 3A. Instead, barriers 32 are offset and placed closer to transmitters 10, 20 and farther away from receivers 16, 26. Barriers 32 still reflect stray radiation from transmitters 10, 20 back toward the transmitters, and prevent the stray radiation from reaching adjacent receivers 16, 26 on the same device.

As FIG. 4B shows, when devices 102, 104 are misaligned by the same amount as shown in FIG. 3B, barriers 32 still reflect electromagnetic radiation in envelopes 14, 24 back toward intended receivers 26, 16. However, the greater distance from receivers 26, 16 to barriers 32 in FIG. 4B may reduce the degree of reflection for envelopes 14, 24 compared with FIG. 3B. Thus the centered barriers 32 of FIG. 3B may provide a large signal strength than for FIG. 4B, for small amounts of mis-alignment.

As FIG. 4C shows, when devices 102, 104 are misaligned by a larger amount than in FIG. 3B, a greater amount of misalignment is tolerated than with the centered barriers 32 of FIG. 3B. The additional offset to barriers 32 from receivers 16, 26 provides for an additional amount of tolerated misalignment, roughly equal to the amount of the additional offset.

For a larger amount of mis-alignment, some of the radiation in envelopes 14, 24 impinges upon the side of barriers 32 facing receivers 26, 16. Barriers 32 reflect this electromagnetic radiation back into envelopes 14, 24 and toward receivers 26, 16. This reflection by barriers 32 may cause the shapes of envelopes 14, 24 to be skewed toward intended receivers 26, 16. The edges or boundaries of envelopes 14, 24 touch barriers 32 but may not extend beyond barriers 32.

As the amount of mis-alignment is further increased, eventually some of the transmitted radiation may impinge upon the other side of barriers 32, the side facing away from intended receivers 26, 16. Also, some of the transmitted radiation may impinge upon the first via in barriers 32 and be reflected backwards toward the transmitter or at some other angle away from intended receivers 26, 16. This occurs at a greater amount of mis-alignment with the offset barriers 32 of FIG. 4 than with the centered barriers 32 of FIG. 3. Thus offset barriers 32 further increase the tolerance to misalignment of devices 102, 104.

FIG. 5 shows mated devices with a higher forward bandwidth than a reverse bandwidth. Device 102 has three transmitters 10 and only one receiver 16. Mated device 104 has three receivers 26 and only one transmitter 20. Thus three times more data may be transmitted per unit of time in the forward direction, from device 102 to mated device 104, than in the reverse direction from mated device 104 back to device 102 (assuming similar electromagnetic signaling characteristics may be employed in all channels). Such asymmetric channels may be desirable for some applications, such as when mated device 104 is a media player or large display screen being driven by media from device 102. Such asymmetric devices may be less prone to crosstalk on the same device since the single receiver may be placed at a greater distance from an adjacent transmitter, and the single receiver has only one adjacent transmitter than two adjacent transmitters. However, at the device 104, the receivers may be more prone to crosstalk from transmitters on device 102. Misalignment between 102 and 104 may cause radiation from one or more transmitters on device 102 to be picked up by more than one receiver on device 104.

Figure 6A:
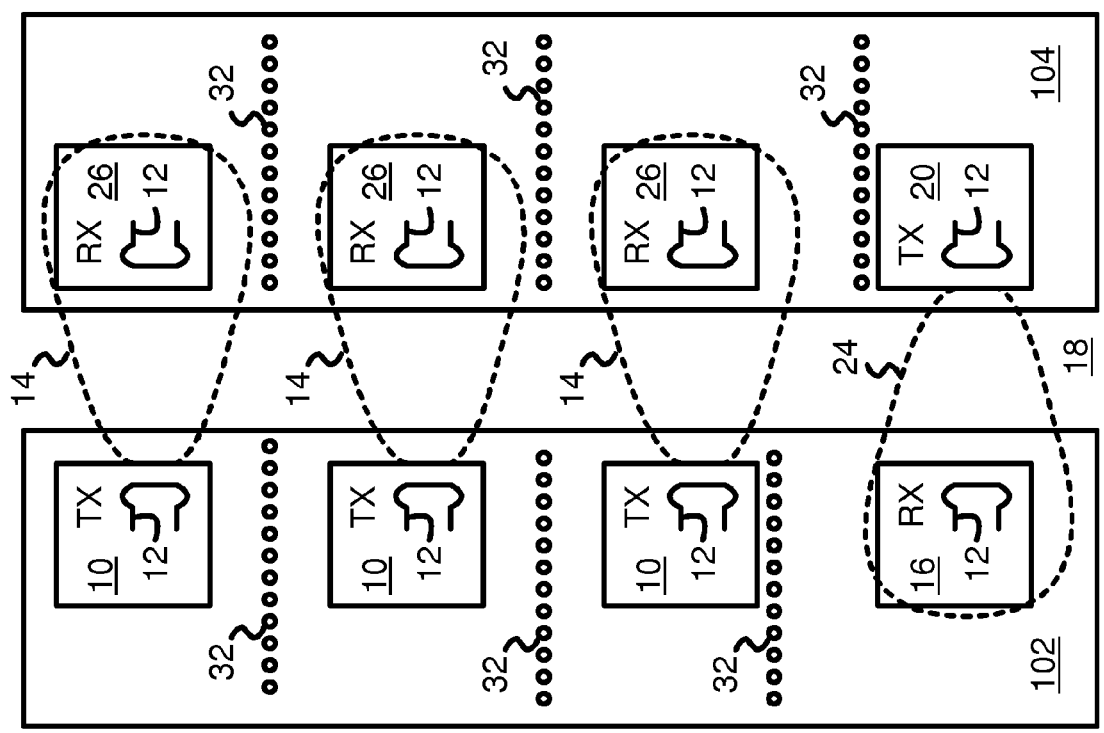
FIGS. 6A-B show asymmetric-bandwidth devices with offset of electromagnetic radiation barriers in the substrates to further improve misalignment tolerance.
Figure 6B:
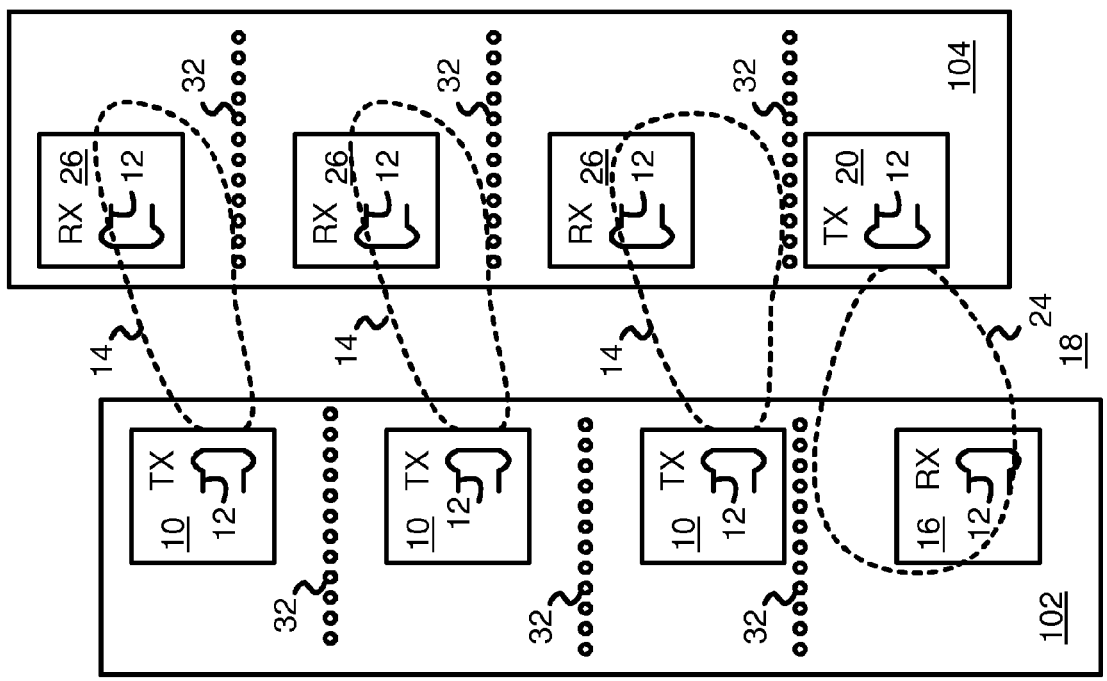

FIGS. 6A-B show asymmetric-bandwidth devices with offset electromagnetic radiation barriers in the substrates to further improve misalignment tolerance. In FIG. 6A, barriers 32 are placed in the center between adjacent transmitters 10. However, between adjacent transmitter 10 and receiver 16, barrier 32 is offset, placed close to transmitter 10 and farther away from receiver 16.

Likewise, for mated device 104, barriers 32 are placed in the center between adjacent receivers 26, but are placed closer to transmitter 20 and farther from receiver 26 where transmitter 20 and receiver 26 are adjacent to each other.

In FIG. 6B, when devices 102, 104 are mis-aligned, barriers 32 reflect the intended electromagnetic radiation in envelopes 14 back toward intended receivers 26. Tolerance may be tightest for the two upper receivers 26 in mated device 104, since barrier 32 is centered between these receivers. Additional spacing is provided by the offset of barriers 32 between transmitter 10 and receiver 16 at the bottom of device 102, and between receiver 26 and transmitter 20 at the bottom of mated device 104. This additional spacing provides for more tolerance of mis-alignment than with the two upper transmitter-receiver pairs.

As misalignment increases, reception may first fail in the upper two receivers 26 of mated device 104, while reception in the lower two transmitter-receiver pairs may continue to be good. The additional bandwidth provided by the upper two transmitter-receiver pairs may fail first, still allowing some reception by the lower two transmitter-receiver pairs, although at a lower forward bandwidth.

Rather than all communication failing at once, maintaining some communication, although at a lower-bandwidth, is quite desirable when misalignment occurs. Thus mis-alignment tolerance is improved for asymmetric-bandwidth devices.

FIGS. 7A-B show misalignment-tolerant edge-firing devices. Devices 92, 94 have their edges placed in close proximity for communication and aligned as shown in FIG. 7A. Substrate 58 may be a printed-circuit board (PCB) (arranged perpendicular to the shown figure), flexible carrier, or other substrate that has transmitter 50 and receiver 54 mounted to and that provides wiring traces, lines, vias, or other kinds of electrical interconnect. Similarly, lower device 94 has substrate 48 (arranged perpendicular to the shown figure) with transmitter 40 and receiver 44 mounted thereon.

When upper device 92 and lower device 94 have their connecting edges brought in close proximity to each other, and communication is enabled, transmitter 50 generates an Extremely High-Frequency (EHF) signal to transmit transducer 52, which directs electromagnetic radiation in envelope 51 downward toward lower device 94. Receive transducer 46 in lower device 94 is located within envelope 51 and receives the EHF signal that is sent to receiver 44 for detection, sensing, extraction of the signal from a clock or carrier wave, amplification, or other signal processing. The received and processed data may be sent over the wiring traces of substrate 48 to other parts of lower device 94, such as to a central processing unit (CPU) (not shown).

Likewise, in lower device 94 transmitter 40 generates an EHF signal to transmit transducer 42, which directs electromagnetic radiation in envelope 41 upward toward upper device 92. Receive transducer 56 in upper device 92 is located within envelope 41 and receives the EHF signal that is sent to receiver 54 for detection, sensing, extraction of the signal from a clock or carrier wave, amplification, or other signal processing. The received and processed data may be sent over the wiring traces of substrate 58 to other parts of upper device 92, such as to a processor or controller (not shown).

In FIG. 7B, upper device 92 is somewhat out of alignment with lower device 94. Transmit transducer 52 is not exactly above receive transducer 46, such that receive transducer 46 is not centered within envelope 51. However, substrate 48 in lower device 94 may contain metal planes near the connecting edge, or other substrate features that redirect electromagnetic radiation away from the surface of substrate 48. The misaligned envelope 51 is redirected or skewed back toward receive transducer 46 by the reflecting features in substrate 48. Thus envelope 51 is shifted toward receive transducer 46 by EHF reflecting features near the surface of substrate 48 (facing transducer 46).

Similarly, the lower end of substrate 58 in upper device 92 contains features that may redirect EHF radiation. EHF electromagnetic radiation emitted by transmitter 40 through transmit transducer 42 forms envelope 41. This electromagnetic radiation impinges upon the left surface of substrate 58 and is reflected back to the left, toward receive transducer 56 for sensing by receiver 54 in upper device 92. Envelope 41 is shifted to the left by EHF reflecting features in substrate 58. Thus some misalignment is tolerated by the EHF-reflecting features in the surfaces of substrates 48, 58.

The EHF re-directing features in the left surface of substrate 58 may also block EHF electromagnetic radiation from envelope 41 from passing through substrate 58 and reaching transmit transducer 52 and possibly interfering with the signal transmitted by transmitter 50 as envelope 51. Likewise, left surface of substrate 48 blocks radiation from interfering, such as by preventing radiation from transmit transducer 42 from reaching receive transducer 46 in lower device 94.

FIGS. 8A-B highlight misalignment-tolerant close-proximity communication for perpendicularly-connected devices. Edge-connecting device 96 is brought near the top surface of docking device 98. When communication is enabled, transmitter 50 in edge-connecting device 96 generates an EHF signal to transmit transducer 52, which directs electromagnetic radiation in envelope 51 downward toward docking device 98. Receive transducer 66 in docking device 98 is located within envelope 51 and receives the EHF signal that is sent to receiver 64 for detection, sensing, extraction of the signal from a clock or carrier wave, amplification, or other signal processing. The received and processed data may be sent over the wiring traces of substrate 68 to other parts of docking device 98, such as to a processor (not shown).

Likewise, in docking device 98 transmitter 60 generates an EHF signal to transmit transducer 62, which directs electromagnetic radiation in envelope 61 upward toward edge-connecting device 96. Receive transducer 56 in edge-connecting device 96 is located within envelope 61 and receives the EHF signal that is sent to receiver 54 for detection, sensing, extraction of the signal from a clock or carrier wave, amplification, or other signal processing. The received and processed data may be sent over the wiring traces of substrate 58 to other parts of edge-connecting device 96, such as to a processor or controller (not shown).

Transmit transducer 62 may direct electromagnetic radiation upward to create envelope 61 in a variety of ways. One or more metal ground planes in substrate 68 under transmitter 60 may reflect electromagnetic radiation upward and prevent envelope 61 from forming in a downward direction under transmitter 60. Transmit transducer 62 may be physically positioned to direct electromagnetic radiation upward. Reflecting metal walls or absorbing material around transmitter 60 may further shape envelope 61.

Similarly, transmit transducer 52 in edge-connecting device 96 may be located near the bottom of transmitter 50, and metal reflectors or absorbing materials may be placed around and/or above transmitter 50, while a high-refractive index material that acts as a lens or window to EMF electromagnetic radiation is placed below transmitter 50 where it is desired to direct envelope 51. A series of metal director bars or terraces of metal layers forming a curved reflector in or above substrate 58 may also be used to direct the electromagnetic radiation forming envelope 51. A variety of such substrate structures are shown in applicant's Provisional Application No. 61/893,061, filed Oct. 18, 2013, for "EHF Fields Propagation Methods and Systems", herein incorporated by reference.

In FIG. 8B, edge-connecting device 96 is somewhat out of alignment with docking device 98. Substrate 58 is not exactly centered above and between receiver 64 and transmitter 60.

EHF reflecting material may be added to the surface (facing transmitter 50) of substrate 58, causing electromagnetic radiation emitted from transmitter 50 and transmit transducer 52 to be reflected downward toward receiver 64, and not pass through (or minimally pass through) substrate 58 to reach receive transducer 56. High-refractive index material (not shown) in edge-connecting device 96 in the region of envelope 61 may direct the electromagnetic radiation in envelope 61 toward receive transducer 56. Thus, some misalignment of edge-connecting device 96 to docking device 98 is tolerated.

Figure 9A:
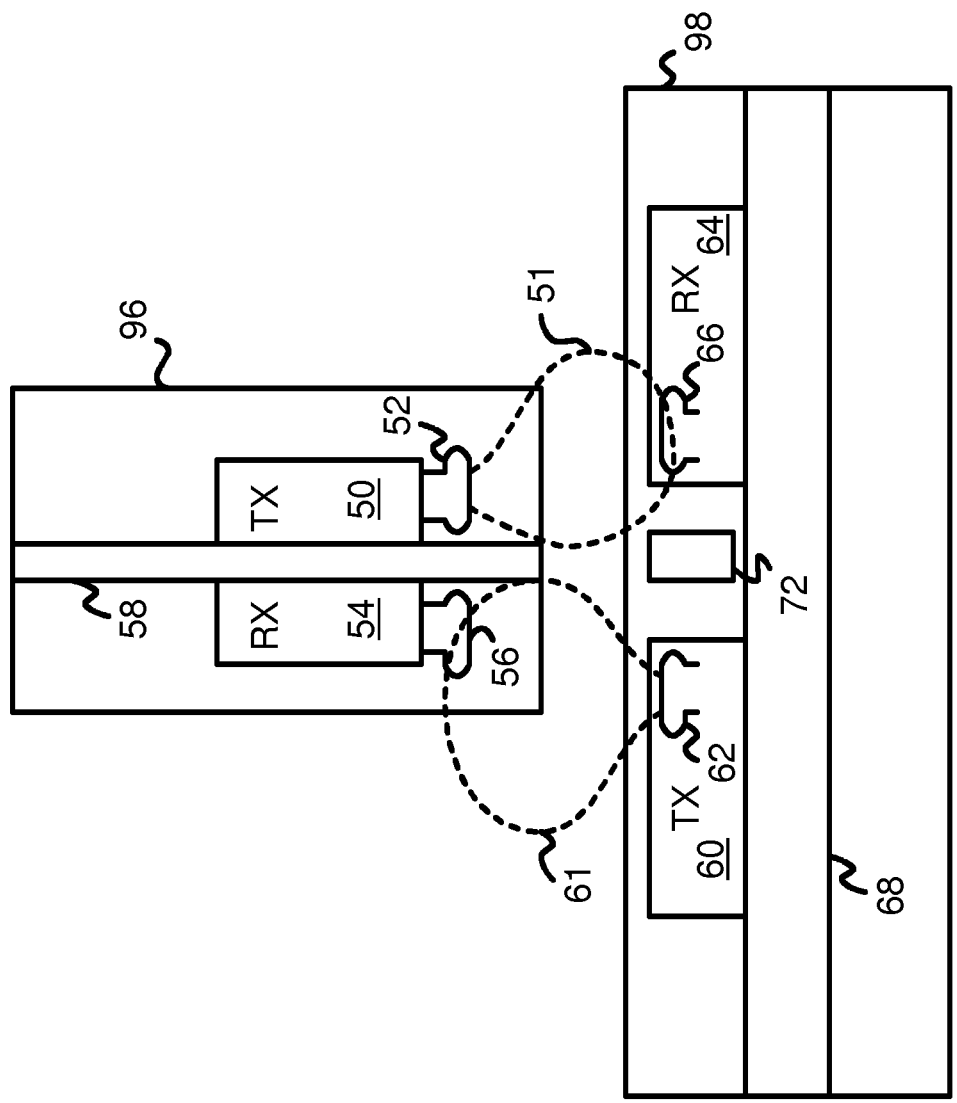
FIGS. 9A-C highlight a docking barrier to improve misalignment-tolerance for close-proximity perpendicularly-connected devices.
Figure 9B:
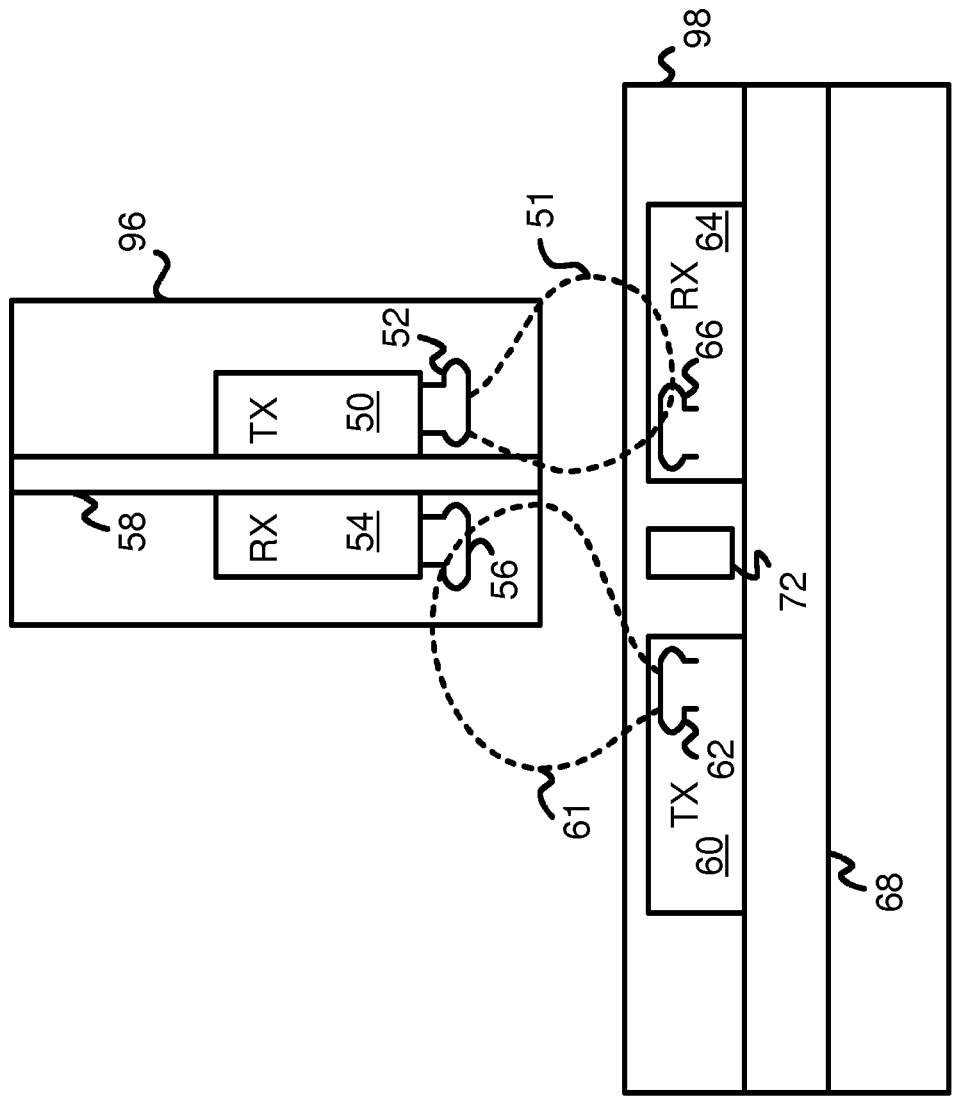
Figure 9C:
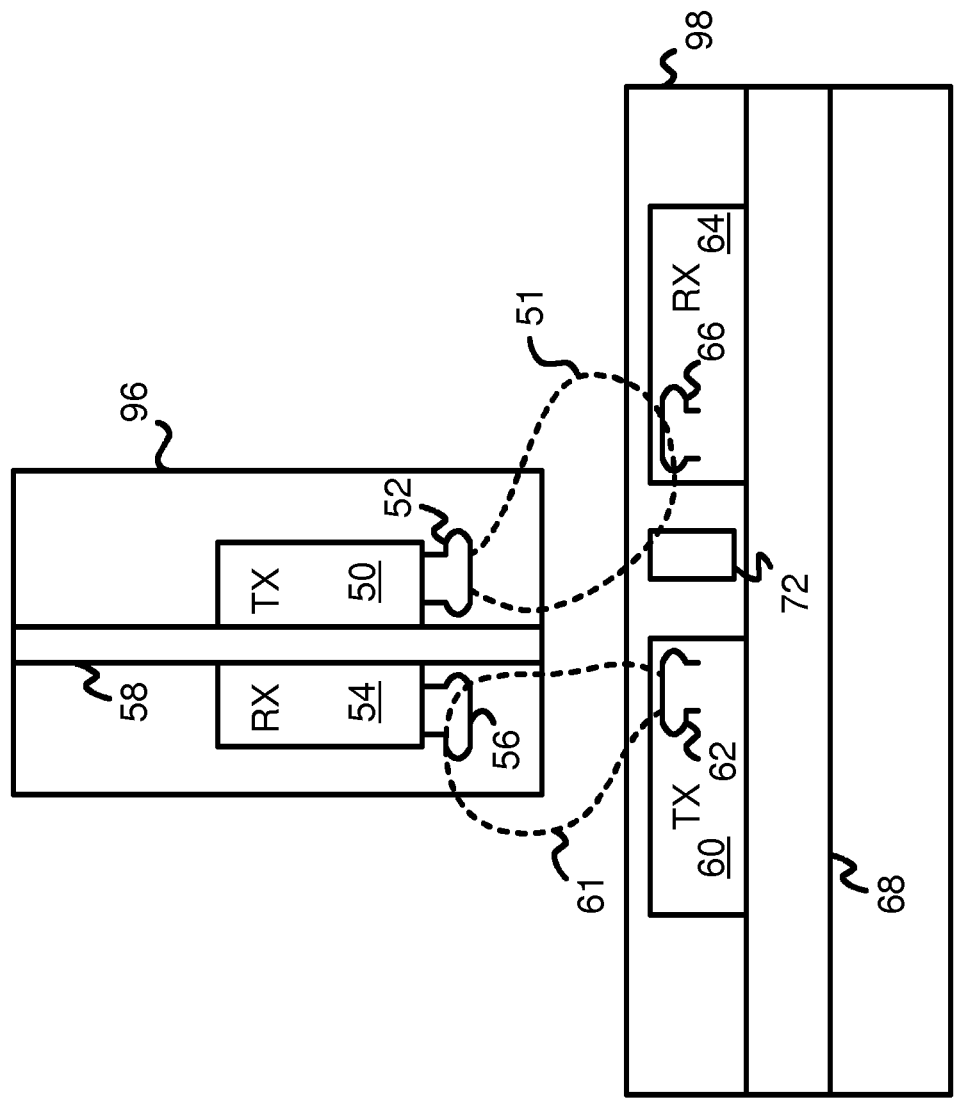

FIGS. 9A-C highlight a docking barrier to improve misalignment-tolerance for close-proximity perpendicularly-connected devices. Barrier 72 is added to docking device 98, between transmitter 60 and receiver 64. Barrier 72 may be a series of vias or other material sufficient to mitigate crosstalk between the devices, such as described earlier for barrier 32 in FIGS. 3-6. Barrier 72 could also be one or more reflecting metal structures that are solid or spaced about a quarter-wavelength or less apart.

In FIG. 9A, barrier 72 acts to block stray electromagnetic radiation from transmitter 60 that might otherwise reach receive transducer 66 of receiver 64. Thus transmit transducer 62 and receive transducer 66 may be placed closer together, and more directly under transmitter 50 and receiver 54, respectively, of edge-connecting device 96 when devices 96, 98 are aligned.

In FIG. 9B, edge-connecting device 96 and docking device 98 are misaligned where edge-connecting device 96 is misaligned to the right. EHF electromagnetic radiation from transmitter 50 is reflected off the surface of substrate 58 (facing transducer 52), which contains reflecting features such as ground planes. A portion of envelope 51 reaches receive transducer 66 of receiver 64 in docking device 98, despite the misalignment. A portion of envelope 61 from transmitter 60 reaches transducer 56 of receiver 54 in edge-connecting device 96. Barrier 72 may help direct envelope 61 upward toward receiver 54, especially if envelope 61 is larger than shown.

In FIG. 9C, edge-connecting device 96 and docking device 98 are misaligned where edge-connecting device 96 is misaligned to the left. EHF electromagnetic radiation from transmitter 50 is reflected off the surface of substrate 58 (facing transducer 52), which contains reflecting features such as ground planes, and also is reflected, absorbed or redirected off of barrier 72 in docking device 98. This reflection, absorption, or redirection by barrier 72 skews envelope 51 to the right and toward receiver 64. This causes a larger portion of envelope 51 (as compared to when there is no barrier 72) to reach receive transducer 66 for receiver 64 in docking device 98, despite the misalignment.

The surface of substrate 58 (facing transducer 56) also reflects, absorbs, or redirects electromagnetic radiation from envelope 61 to the left and towards receive transducer 56 and receiver 54. A reflection off the surface of substrate 58 causes a larger portion of envelope 61 (as compared to when there is no reflection) from transmitter 60 to reach receive transducer 56 for receiver 54 in edge-connecting device 96. Thus some misalignment is tolerated by the addition of barrier 72 and reflecting features on the surface of substrate 58.

Figure 10B:
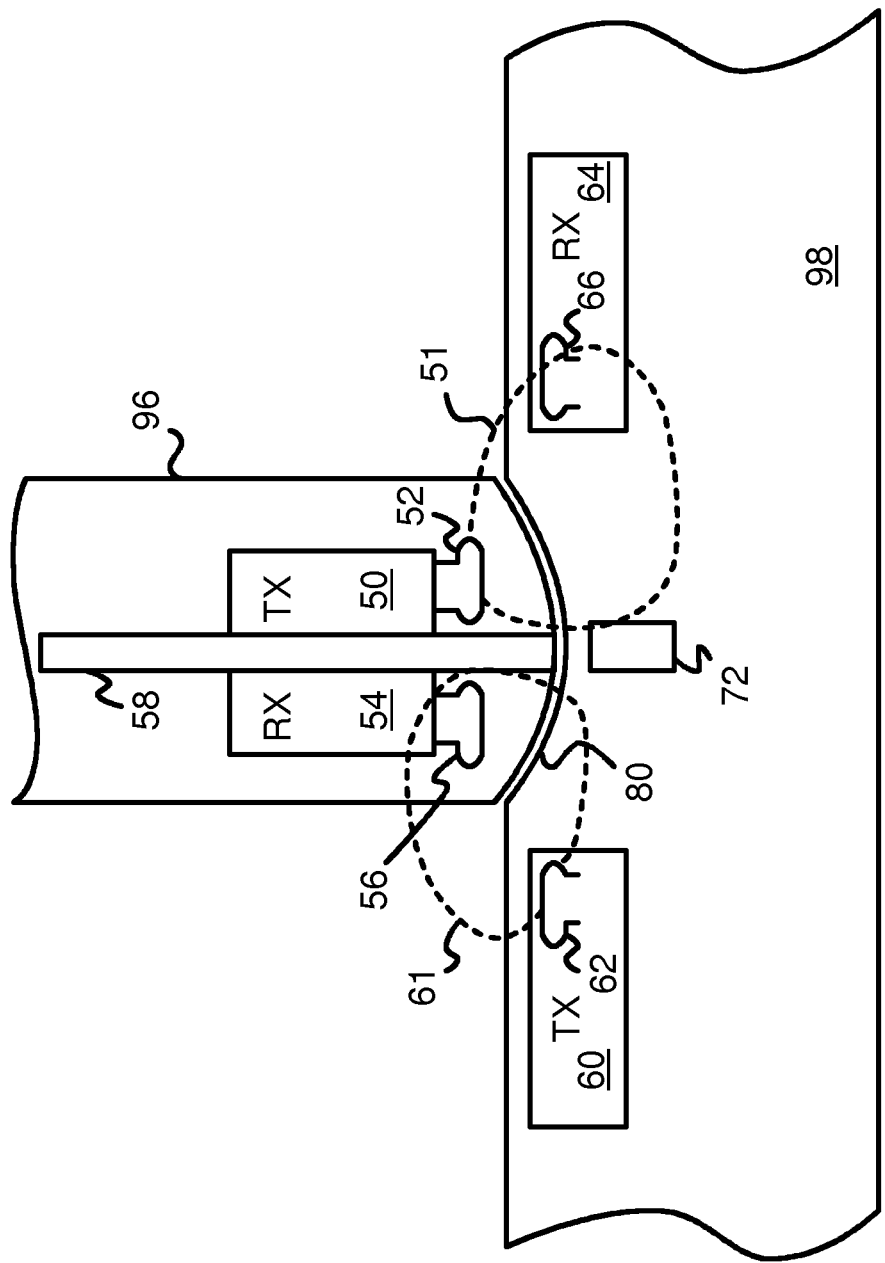
Figure 10C:
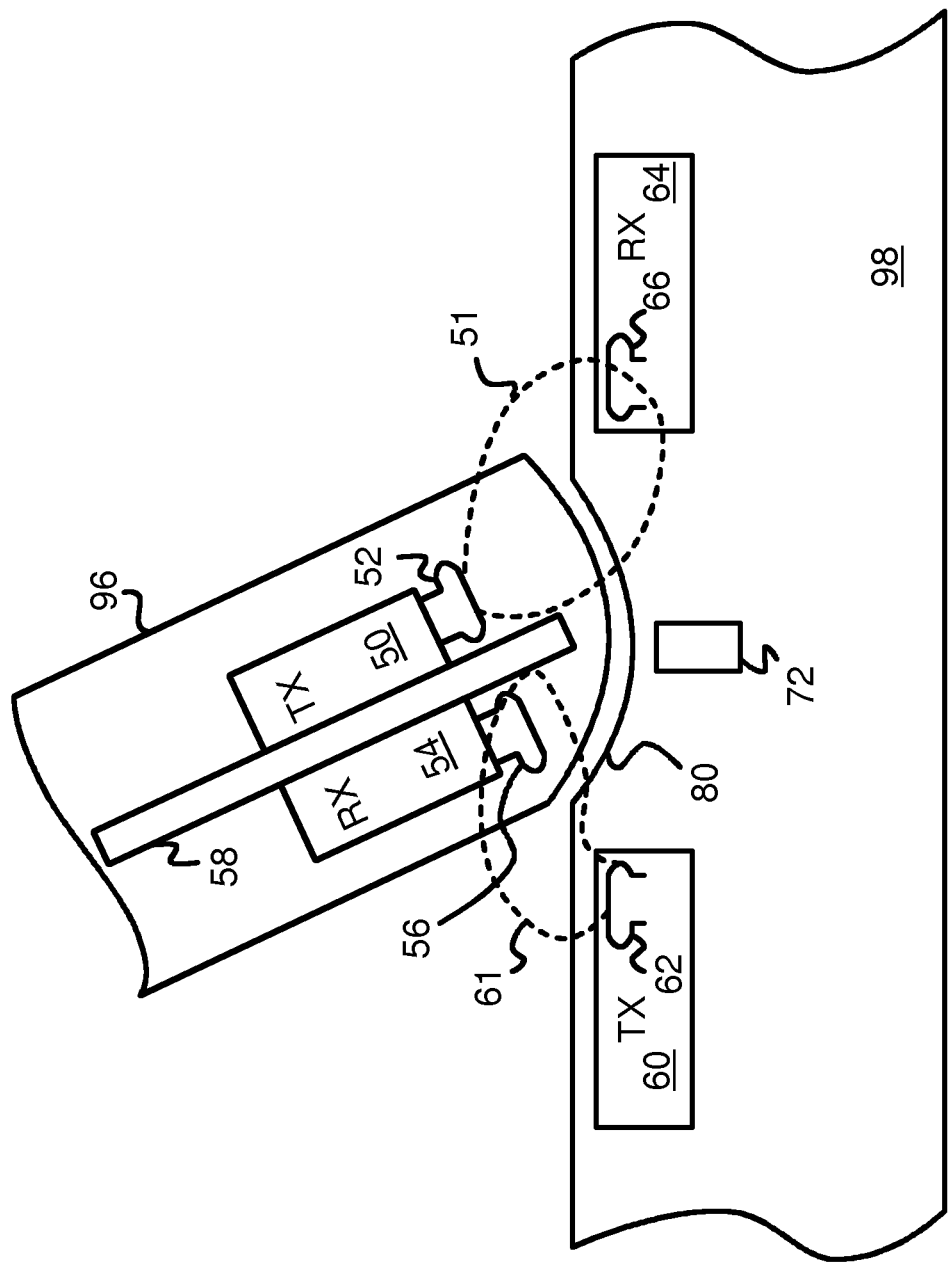

FIGS. 10A-C highlight an alignment key and docking barrier to improve misalignment-tolerance for close-proximity perpendicularly-connected devices. Curved depression 80 is formed on the top surface of docking device 98, where the connecting edge of edge-connecting device 96 should be placed for best alignment. Curved depression 80 may have a variety of shapes that help guide edge-connecting device 96 into proper position when edge-connecting device 96 is brought close to docking device 98.

In FIG. 10A, edge-connecting device 96 is being lowered into position above docking device 98, but has not yet been fully lowered into position. Envelope 61 does not yet sufficiently reach receive transducer 56 for receiver 54, while envelope 51 from transmitter 50 just barely reaches receive transducer 66 in receiver 64.

Barrier 72 is added to docking device 98, below curved depression 80 and between transmitter 60 and receiver 64. Barrier 72 may be a series of vias, such as described earlier for barrier 32 in FIGS. 3-6, or other material sufficient to mitigate crosstalk between the devices, or one or more reflecting metal lines. The reflecting features in barrier 72 may be spaced about a quarter-wavelength or less apart. Since barrier 72 is slightly lower in FIG. 10 than in FIG. 9, due to curved depression 80, barrier 72 may be slightly less effective in reducing stray electromagnetic radiation and in reflecting intended signals.

In FIG. 10B, edge-connecting device 96 has been lowered into place. A curved bottom edge of edge-connecting device 96 is shaped to fit into curved depression 80. The matching curves of the bottom of edge-connecting device 96 and curved depression 80 help the user to place edge-connecting device 96 into alignment with docking device 98. The curved bottom edge of edge-connecting device 96 may slide within curved depression 80 until the bottom of curved depression 80 is reached, improving alignment.

When edge-connecting device 96 is placed within curved depression 80, envelope 61 is able to reach receive transducer 56 for receiver 54, and envelope 51 from transmitter 50 is able to reach receive transducer 66 in receiver 64. Barrier 72 reflects part of the electromagnetic radiation of envelope 51 back toward receive transducer 66, increasing the signal strength at receiver 64. The reflecting features on the surface of substrate 58 (facing transducer 66) reflect some of the electromagnetic radiation in envelope 51 back toward receive transducer 56 so that the received signal strength of receiver 54 is increased. Thus signal strength is improved when edge-connecting device 96 and docking device 98 are properly aligned.

In FIG. 10C, edge-connecting device 96 is tilted at an angle to docking device 98, rather than being perpendicular. An external guide, support, holder, or other mechanism (not shown) may be present to support edge-connecting device 96 at an angle. Viewing of a display screen on edge-connecting device 96 may be enhanced by the non-perpendicular angle.

The bottom edge of edge-connecting device 96 fits into curved depression 80, helping align the devices. The angled connection causes receive transducer 56 to be closer to transmitter 60, allowing envelope 61 to more fully enclose receive transducer 56, increasing the signal strength at receiver 54. However, the angled connection causes receiver 64 to be farther away from transmitter 50, causing less radiation from envelope 51 to reach receive transducer 66, resulting in a lower signal strength for receiver 64. However, some reflection occurs at the surface of substrate 58 (facing transducer 52), and this reflection may be enhanced somewhat by the obtuse angle used.

Alternate Embodiments

Several other embodiments are contemplated by the inventors. For example while devices with one transmitter-receiver pair and four transmitter-receiver pairs have been shown, a different number of transmitters and receivers per devices could be substituted, such as 8 transmitters or receivers per devices. The devices may be in other arrangements, such as a grid on each device. In a grid arrangement, it is imperative to mitigate crosstalk between the devices and it is contemplated that structures such as described in this invention could be used to mitigate any crosstalk effects. Other arrangements are possible and similar techniques could be used for a number of applications.

In FIGS. 7-10, there may be other opposing pairs of transmitter 50 and receiver 54 mounted to substrate 58 that are not shown, such as above or below the plane of FIG. 7A, and still along the edge of device 92 that is in close proximity to device 94. There could be more transmitters than receivers, such as by having two opposing transmitters as a pair. Other orientations, angles, and connections between devices could be used as there are many possible variations and combinations.

Receive transducer 46 may be integrated with receiver 44 on a same substrate, such as on a silicon or Gallium-Arsenide or other semiconductor substrate for an integrated circuit (IC) chip, or on a multi-chip module, or may be separate from an IC receiver chip but contained within a receiver module of some sort. This receiver module may contain metal reflectors, dielectric lenses or absorbers to direct and focus the EHF radiation onto receive transducer 46. Similarly, transmitter 50 may be integrated with transmit transducer 52 either on a same semiconductor substrate, or on a module substrate, or may be separate. The module or its substrate may contain metal reflectors, planes, lenses, or absorbers to direct the EHF electromagnetic radiation directed by transmit transducer 52 towards receive transducer 46. Other transmitters and receivers may also be similar. Multi-chip modules that contain a transmitter and transmit transducer, or a receiver and receive transducer or other components, may be connected to substrates 48, 58, 68 by a ball grid array (BGA), pads, pins, or other electrical connectors. Various other components such as capacitors, resistors, driver IC's, processors, logic IC's, voltage controllers, etc. may be present but are not shown.

Barrier 72 may be a solid block of metal or other reflecting material, or may be a row of metal-filled vias that are spaced apart by one-quarter of an electromagnetic wave's wavelength or less. Barrier 32 could likewise be a row of metal-filled vias, or could be a solid block of metal. Ground planes, metal blocks, vias, or other metal features in barriers 32, 72 or at the end of substrate 58 may be connected together and to a fixed voltage such as ground, or may be left floating. Barrier 72 could also be a radiation absorptive material, a dielectric, or other substance that can absorb, direct, or reflect EHF radiation.

While EHF-reflecting features such as metal planes or metal-filled vias on the surfaces of substrates 48, 58 and in barriers 32, 72 have been described, an EHF absorbing feature could be substituted to block cross-talk, although signal strength would not be increased since there would be little or no signal reflection. A high-dielectric material may also be used as a lens to focus the EHF radiation. Edge-launch transmitters such as transmitter 50 in FIG. 8A may use curved reflectors, while vertical-launch transmitters, such as transmitter 60 of FIG. 8A may use mezzanine structures with combinations of materials.

Various combinations of these materials may be used to redirect and guide the EHF radiation. For example, a mezzanine structure for transmitter 60 and transmit transducer 62 may be surrounded by a combination of materials: a reflective surface placed opposite to the desired direction of envelope 61, with respect to transmitter 60, to reflect electromagnetic radiation back toward the intended receiver, non-conductive materials on other sides of transmitter 60 to further shape envelope 61 and to provide structural integrity or support of other components, and electromagnetic absorbing materials and low-dielectric constant materials to reduce stray electromagnetic radiation.

The terms upward, downward, horizontal, vertical, etc. are relative terms and may change with or depend on the viewer's reference frame. While separate transmitter 50 and receiver 54 chips or modules have been described, a single transceiver chip or module could be used to drive both transmit transducer 52 and to process signals from receive transducer 56.

A series of metal director bars or terraces of metal layers forming a curved reflector in or above substrate 58 may also be used to direct the electromagnetic radiation forming envelope 51 or other envelopes. A spherical or curved reflecting surface or a flat reflecting surface could be formed to focus and direct electromagnetic radiation in a desired direction, while a shield could be added to block stray radiation. A variety of such substrate structures are shown in applicant's Provisional Application No. 61/893,061, filed Oct. 18, 2013, for "EHF Fields Propagation Methods and Systems", herein incorporated by reference.

Housings, casings, shells, or other enclosures of devices may also be used to shape electromagnetic radiation envelopes. When the spacing between a metal ground plane in the substrate and metal in a housing is less than half a wavelength, wave propagation may be suppressed. Multiple parallel ground planes may be used to suppress electromagnetic radiation propagation, where each plane is spaced less than half a wavelength or less from the adjacent planes, or a quarter-wavelength or less. The plane surface may be orientated to be parallel to the electric field polarization. The plane or other barrier itself could have dimensions that are half a wavelength or more, and could be as large as the width of the substrate or other macro feature. The wavelength is that of the desired or undesired electromagnetic radiation, such as EHF, and the wavelength may be adjusted for the dielectric constant or permittivity of the media, such as a plastic material rather than air.

Metal barriers, bars, rows of vias, or planes may include a gap, opening, or hole to allow electromagnetic radiation to escape in a desired direction.

Substrates 48, 58, 68 or other substrates may be a printed-circuit board (PCB), a flexible carrier, or other kind of substrate that has transmitters, receivers, or other components mounted to and that provides wiring traces, lines, vias, or other kinds of electrical interconnect. Several parallel metal planes spaced a quarter-wavelength or less apart may be included in the substrates to suppress propagation of electromagnetic radiation through the substrate itself. Each substrate may be composed of one or more portions or segments that may be joined together. Thus a single substrate may be a continuous substrate or may have several parts that are connected together, such as by electrical connectors.

The size of electromagnetic radiation envelopes 14, 24, 41, 51, 61 may be larger than shown so that some envelopes, such as envelopes 14, 24, overlap each other. Superposition of electromagnetic radiation waves from envelopes may occur, causing standing waves, maxima and minima nodes, degrading signal strength and producing cross-talk. Also, the electromagnetic radiation does not suddenly drop to zero at the boundary of electromagnetic radiation envelopes, as these are just abstractions of a much more complex electromagnetic radiation field.

The shapes and orientation of close-proximity radiation envelopes such as envelope 51 shown in the drawings are simplified. Real radiation patterns may have variations in intensities, nodes, relative maxima and minima, may bend around objects or through objects and may spread out or become narrow in unusual ways. Actual envelopes may be asymmetric and have odd shapes. Envelopes may be simulated or measured with various instruments and/or software tools.

Many wireless connection applications require a very small form factor, such as for a smart phone or tablet wirelessly connecting to a dock. Transmitter 50 or similar transmitters or receivers may need to be less than 1 cm per side, while edge-connecting device 96 may need to be 5 cm on its longest dimension. Some applications may require that transmitter 50 be only 0.5 cm in the longest dimension. Envelope 51 and other envelopes may be very small in size, such as less than 2 cm before near-field effects die out.

While a slight air gap has been shown between the devices, such as between devices 96, 98 in FIG. 10C, mated devices, such as devices 96, 98, may be physically touching each other. Additional guides, holders, clamps, channels, or other features may be present to hold device 96 in position with mated device 98, or to guide device 96 into a better alignment as devices 96, 98 are brought closer together.

Periodic close-proximity directors may be added. Metallic micro-strips may be formed in substrates 48, 58, 68. These metallic micro-strips may act as Yagi directors. The metallic micro-strips are placed parallel to each other and with a spacing of a fraction of one wavelength of the carrier wave of electromagnetic radiation emitted from transmit transducer 52. Envelope 51 reaches the first of the metallic micro-strips which then carry the emitted electromagnetic waves along the array of metallic micro-strips. Reflected electromagnetic waves are then sent from the last of metallic micro-strips towards receive transducer 66 in the example of FIG. 8A when the micro strips are formed near the end of substrate 58. The metallic micro-strips are perpendicular to the propagation direction of electromagnetic radiation waves. These waves may travel a distance greater than that of envelope 51 with the aid of the micro-strips.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be electromagnetic signals such as can be carried over a waveguide or through dielectric materials.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A close-proximity device comprising:
  a substrate having metal wiring traces for making electrical connections;
  a first integrated circuit (IC) chip mounted to the substrate, the first IC chip comprising:
    a transmitter for generating a transmit signal having a transmit frequency;
    a transmit transducer coupled to the transmitter, receiving the transmit signal from the transmitter and generating transmitted electromagnetic radiation in a transmit envelope of radiation;
  a second IC chip mounted to the substrate, the second IC chip comprising:
    a receiver for receiving a signal having a receive frequency;

a receive transducer, coupled to the receiver, receiving a portion of an envelope of received electromagnetic radiation emitted from a transmitter on a second device that is within a close proximity, the receive transducer generating a received signal; and a barrier situated between the transmit transducer of the first IC chip and the receive transducer of the second IC chip, the barrier blocking a portion of the transmitted electromagnetic radiation from the transmit transducer to the receive transducer.

2. The close-proximity device of claim 1, wherein the transmit frequency is an Extremely High-Frequency (EHF) within a range of 30-300 GHz.

3. The close-proximity device of claim 2 wherein the barrier is formed in the substrate;

wherein the barrier reflects a portion of the transmitted electromagnetic radiation away from the receive transducer;

wherein the barrier decreases a strength of the transmitted electromagnetic radiation that is collected by the receive transducer; and wherein the barrier reflects a portion of the received electromagnetic radiation in a direction toward the receive transducer.

4. The close-proximity device of claim 3 wherein the barrier is an absorptive material formed in the substrate or on the substrate.

5. The close-proximity device of claim 3 wherein the barrier is a dielectric material formed in the substrate or on the substrate.

6. The close-proximity device of claim 3 wherein the barrier is a solid block of metal formed in the substrate or on the substrate.

7. The close-proximity device of claim 3 wherein the barrier is a plurality of metal planes formed within the substrate, wherein adjacent metal planes in the plurality of metal planes are parallel and spaced no more than one-quarter of a wavelength of the transmitted electromagnetic radiation.

8. The close-proximity device of claim 3 wherein the barrier is formed near a connecting end of the substrate, the connecting end of the substrate being closer to the second device than other portions of the substrate during proper alignment of devices.

9. The close-proximity device of claim 3 wherein the barrier is a row of vias formed in the substrate, the row of vias being located between the transmitter and the receiver.

10. The close-proximity device of claim 9 wherein the row of vias comprises metal-filled vias.

11. The close-proximity device of claim 10 wherein a spacing between adjacent vias in the row of vias is no more than one-quarter of a wavelength of the transmitted electromagnetic radiation.

12. The close-proximity device of claim 1 wherein the barrier is located between the transmitter and the receiver and closer to the transmitter than to the receiver;

whereby the barrier is not centered between the transmitter and the receiver, the row of vias being closer to the transmitter than to the receiver.

13. The close-proximity device of claim 1 wherein the close-proximity device comprises at least two transmitters and at least two receivers;

wherein each transmitter generates electromagnetic radiation in a transmit envelope that is directed toward a different receiver on the second device.

14. The close-proximity device of claim 1 wherein each transmitter generates electromagnetic radiation in a transmit envelope that is directed laterally in a direction that is substantially parallel to the substrate;

whereby transmitters emit electromagnetic radiation in a lateral direction.

15. The close-proximity device of claim 1 wherein each transmitter generates electromagnetic radiation in a transmit envelope that is directed upward in a direction that is substantially perpendicular to the substrate;

whereby transmitters emit electromagnetic radiation in an upward direction.

16. A close-proximity device comprising:

a substrate having metal wiring traces for making electrical connections;

a transmitter mounted to the substrate, for generating a transmit signal having a transmit frequency;

a transmit transducer coupled to the transmitter, receiving the transmit signal from the transmitter and generating transmitted electromagnetic radiation in a transmit envelope of radiation;

a receiver mounted to the substrate, for receiving a signal having a receive frequency;

a receive transducer, coupled to the receiver, receiving a portion of an envelope of received electromagnetic radiation emitted from a transmitter on a second device that is within a close proximity, the receive transducer generating a received signal; and a barrier situated between the transmit transducer and the receive transducer, the barrier blocking a portion of the transmitted electromagnetic radiation from the transmit transducer to the receive transducer; and a curved depression formed in a housing that encloses the close-proximity device, the curved depression having a shape that complements a connecting end of a second device;

wherein the barrier is formed below the curved depression of the second device;

wherein the curved depression guides the second device into close proximity and alignment due to matching shapes.

17. The close-proximity device of claim 16 wherein the transmitter in the second device emits electromagnetic radiation directed laterally in a direction that is substantially parallel to the substrate in the second device;

wherein the transmitter in the close-proximity device emits electromagnetic radiation directed upward in a direction that is substantially perpendicular to a substrate of the close-proximity device.

18. The close-proximity device of claim 16, wherein the transmit frequency is an Extremely High-Frequency (EHF) within a range of 30-300 GHz.

19. The close-proximity device of claim 18 wherein the barrier is formed in the substrate;

wherein the barrier reflects a portion of the transmitted electromagnetic radiation away from the receive transducer;

wherein the barrier decreases a strength of the transmitted electromagnetic radiation that is collected by the receive transducer; and wherein the barrier reflects a portion of the received electromagnetic radiation in a direction toward the receive transducer.

20. The close-proximity device of claim 19 wherein the barrier is an absorptive material formed in the substrate or on the substrate.

* * * * *